Dec. 3, 1963

O. J. MUETZ 3,112,783

VEHICLE ICE GRIPS

Filed June 1, 1960

Otto J. Muetz
INVENTOR.

BY *Clarence A. O'Brien*
*and Harvey B. Jacobson*
Attorneys

Dec. 3, 1963     O. J. MUETZ     3,112,783
VEHICLE ICE GRIPS
Filed June 1, 1960     2 Sheets-Sheet 2
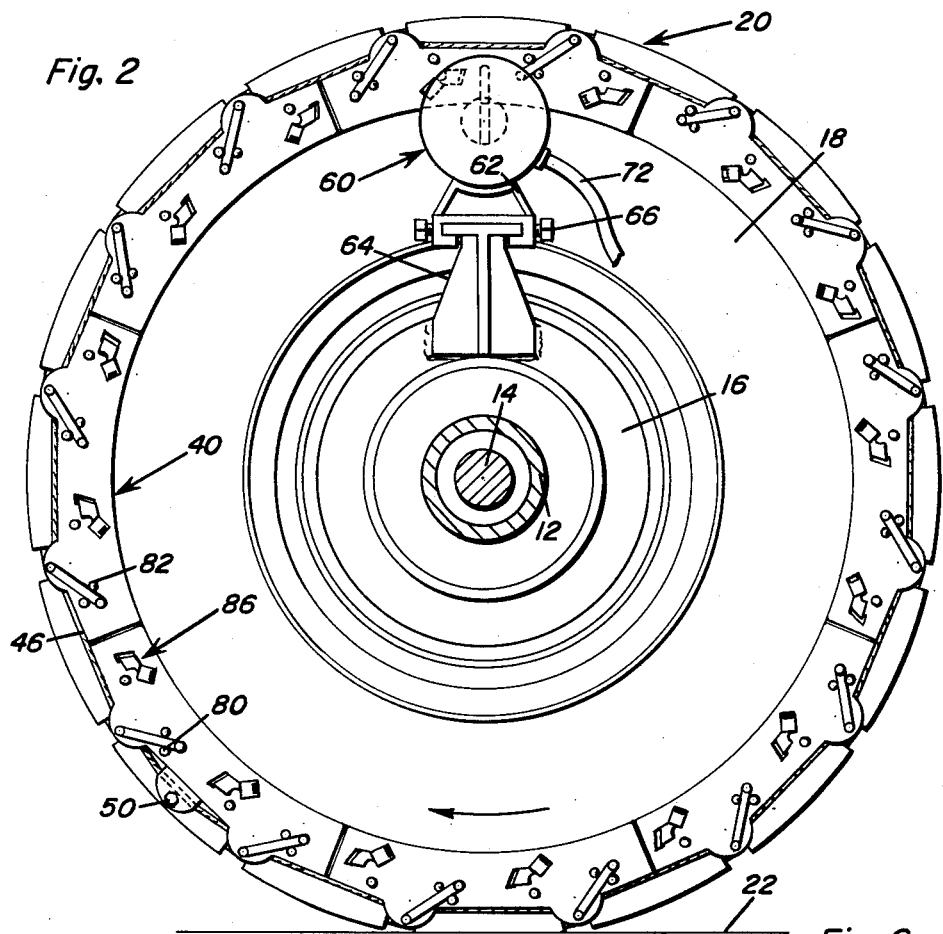
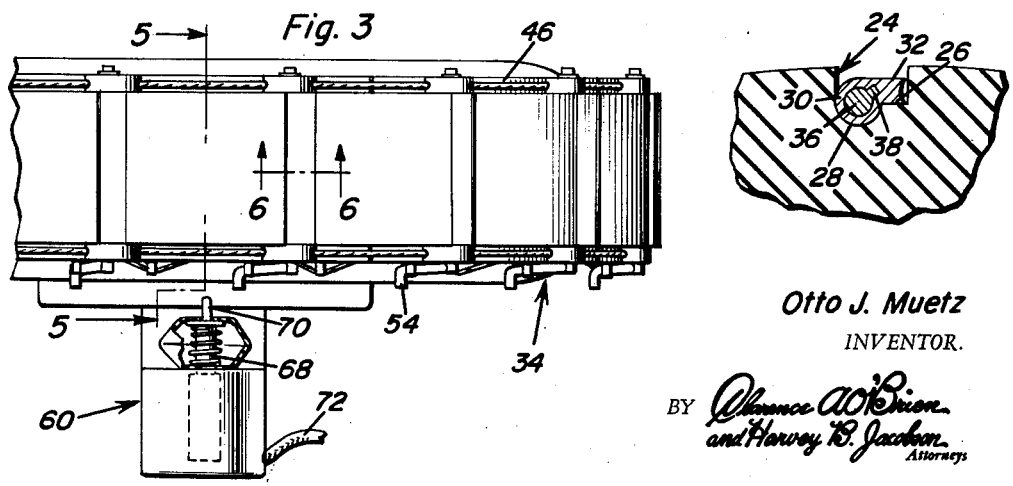
Otto J. Muetz
INVENTOR.

United States Patent Office 3,112,783
Patented Dec. 3, 1963

3,112,783
VEHICLE ICE GRIPS
Otto J. Muetz, Hazelhurst, Wis.
(2233 Jersey Ave. S., St. Louis Park 26, Minn.)
Filed June 1, 1960, Ser. No. 33,171
5 Claims. (Cl. 152—208)

This invention relates generally to vehicle equipment and more particularly to novel and improved means for use with vehicle tires for assuring positive gripping on ice or snow.

In recent years there has been a significant trend toward the use of snow tires and a relative decrease in the use of tire chains. Many persons have found the use of chains to be often inconvenient inasmuch as the installation thereof is time consuming and sometimes difficult. Moreover, in many regions of the country, side streets often remain snow-bound while main arteries are cleared. Under these circumstances, the chains are required in order for a person to emerge his vehicle from his driveway along the side street and to the main artery, but are not required and, as a matter of fact, are a hindrance when the main artery is reached. When chains are employed on the dry pavement of cleared roads, the chains and tires are often damaged. Moreover, the sound of the chains moving along the dry pavement is often irritating. For these reasons, snow tires have become increasingly popular inasmuch as they represent somewhat of a compromise between the use of chains and standard tire treads. Although they are not as satisfactory as chains on snow and ice, they are clearly superior on main dry roads. The disadvantage of the snow tires is found in the fact that they often do not provide sufficient positive gripping on snow or ice and although superior to standard tire treads are sometimes inadequate to permit the vehicle to proceed up icy inclines.

In the light of the above, it is the principal object of this invention to provide novel and improved vehicle tire gripping means which permit the positive gripping on icy surfaces and which allow for movement along a dry road surface without the discomfort and damaging effects accompanying the use of conventional chains.

It is a more particular object of this invention to provide a novel combination of a vehicle tire and gripping means therefor wherein the gripping means may be selectively disposed in either an operative or an inoperative position. Moreover, means are provided for selectively positioning the gripping means by the operator from his normal driving position. For that purpose, actuating means in a form of a push button or such are mounted on the vehicle dashboard which, in turn, operates a solenoid or such for positioning the gripping means as desired.

It is a still more particular object of this invention to provide novel ice gripping means for vehicles wherein selective reverse and forward rotation of the rear vehicle wheels automatically disposes said gripping means in the operative or inoperative position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a sectional view taken through the axle housing of a vehicle illustrating the inner face of a rear vehicle wheel showing the tire constructed in accordance with the teachings of this invention in an inoperative gripping position;

FIGURE 3 is a fragmentary plan view of a tire constructed in accordance with the teachings of this invention showing the tire in an inoperative gripping position;

FIGURE 6 is an enlarged sectional view taken substantially along the plane 6—6 of FIGURE 3.

Figure 1:
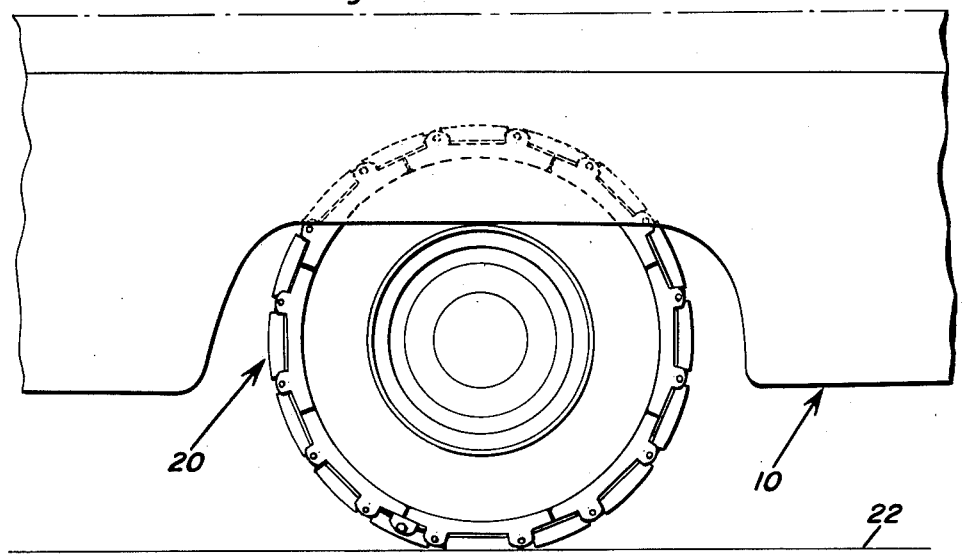
FIGURE 1 is an elevational side view of a vehicle tire constructed in accordance with the teachings of the invention showing the tire in operative gripping position.

With continuing reference to the drawings, numeral 10 generally represents a conventional vehicle including an axle housing 12, an axle 14 and a brake drum housing 16. The wheel 18 of the vehicle is, of course, terminally carried by the axle 14 and driven thereby. A tire 20 constructed in accordance with the teachings of this invention is fitted on the wheel 18 and is adapted to ride along the ground surface 22.

The tire 20 is formed of rubber in a conventional manner but, however, defines axially extending recesses 24 spaced along the circumference thereof. The recesses 24 are rectangular in cross-section and are best illustrated in detail in FIGURE 6. The recesses 24 are preferably spaced about every five inches along the circumference of the tire 20. The recesses 24 define upstanding walls which extend substantially radially of the tire and a bottom surface 26 in which is formed a semi-circular cavity 28. Disposed within the cavity 28 is a hollow circular hub 30 having a tangential gripping element 32 extending therefrom. The hub 30 is rotatable within the semi-circular cavity 28 with the tangential gripping element 32 movable between the tangential inoperative gripping position illustrated in FIGURE 6 and the radial operative gripping position illustrated in FIGURE 4.

Shifting arms 34 define first portions 36 which extend through the hub 30 and are keyed thereto as at 38. The gripping members including the hub 30 and gripping element 32 and the first portions 36 of the shifting arms 34 extend across the full width of the tire 20 in the recess 24. The first portions 36 of the shifting arms 34 extend beyond the width of the tire 20 on either side of the axial recess 24.

A plurality of shifting plates 40 are provided. Each of the shifting plates 40 is arcuate and corresponds to a portion of the arc of the tire circumference. The plates 40 are disposed end-to-end adjacent each face of the tire 20. Each of the plates 40 defines a pair of ears 42 with the ears being alignable with the axial recesses 24. The ears 42 are apertured and the first portion 36 of the shifting arm 34 extends through the apertures in the ears 42 and is journaled therein. The ears further define passages 44 through which extend cables 46. The cables 46 retain all of the plates 40 adjacent each face of the tire 20 together. A connector 50 is provided for closing the cable 46 to make it continuous.

The shifting arms 34 are provided with second portions 52 which extend parallel and adjacent to the inner face of the tire 20 and perpendicular to the first portions 36 of the shifting arms 34. A terminal projection 54 is disposed on each of the second portions 52, extending perpendicular thereto.

Figure 4:
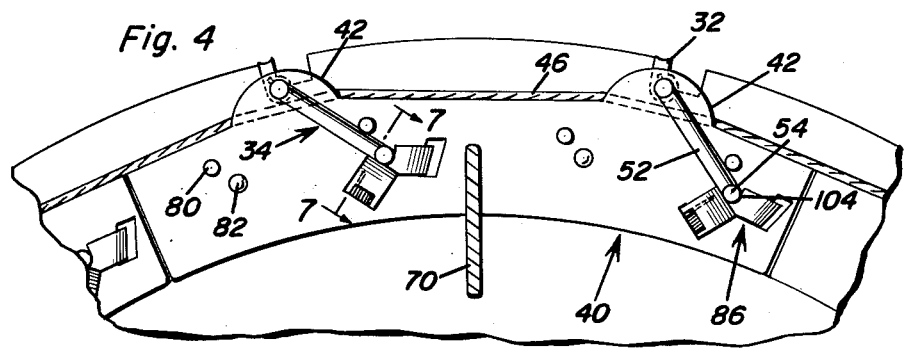
FIGURE 4 is a fragmentary sectional view illustrating a portion of a tire constructed in accordance with the teachings of this invention showing the gripping means thereof in an operative position.

It will be appreciated that when the second portions 52 of the shifting arms 34 are disposed in the position in FIGURE 4, the gripping elements 32 will be disposed radially of the tire 20 or in an operative position.

When the second portions 52 of the shifting arms 34 are pivoted clockwise from the position illustrated in FIGURE 4 to the position illustrated in FIGURE 2, the gripping elements 32 will be carried to an inoperative position particularly shown in FIGURE 6.

In order to shift the shifting arms 34 from the position illustrated in FIGURE 4 to the position illustrated in FIGURE 2, a solenoid 60 secured to bracket 62 is adjustably mounted on support 64 welded to the brake drum housing or backing plate 16. The bracket 62 is slidably movable along the support 64 with setscrews 66 being provided for locking the bracket 62 in a desired position. The solenoid 60 includes an armature 68 which is spring-urged rearwardly or away from the inner tire face. Terminally carried by the armature 68 is an engaging block 70 which, upon the energization of solenoid 60, moves into the plane of the projections 54 for engagement therewith upon rotation of the tire 20. The solenoid 60 may be energized through conductor 72 which may be controlled through a switch mounted on the vehicle dashboard.

When the solenoid 60 is energized, the engaging block 70 is projected into the plane of the projections 54 of the shifting arms 34 as noted above. Let us initially assume that the shifting arms 34 are in the position illustrated in FIGURE 2 and that the normal forward rotational direction of the tire 20 is indicated by the arrow shown in FIGURE 2. If the vehicle is placed in reverse gear and the tire 20 shown in FIGURE 2 is moved in a direction opposed to the direction indicated by the arrow, the engaging block 70 will engage the projections 54 and pivot the shifting arms 34 to the position illustrated in FIGURE 4 so as to project the gripping elements 32 from the recesses 24. It will, of course, be appreciated that with the gripping elements 32 extending from the recesses 24, positive gripping of the road surface 22 will result. If, on the other hand, the shifting arms 34 are placed in the operative position illustrated in FIGURE 4 and then the solenoid 60 is energized so as to project the engaging block 70 with the tire 20 then being rotated in a clockwise direction, the engaging block 70 will engage the projections 54 so as to pivot the shifting arms 34 back to the inoperative position shown in FIGURE 2. As previously noted, the projections 54 are connected to the first portions 36 of the shifting arms 34 through the second portions 52. The first portions 36 are keyed to the hub 30 and gripping elements 32 of the gripping members with the hub 30 rotatable in the semicircular cavity 28 in the axial recesses 24.

Figure 5:
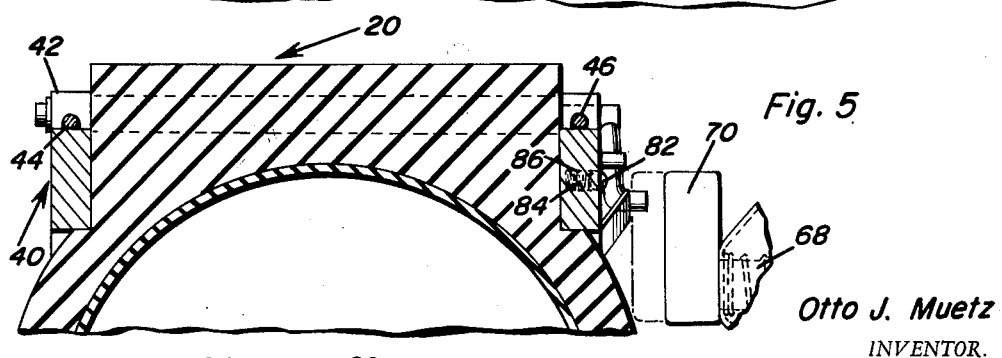
FIGURE 5 is an enlarged sectional view taken substantially along the plane 5—5 of FIGURE 3.
Figure 7:
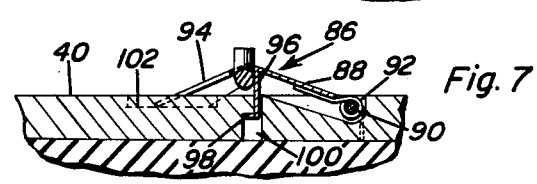
FIGURE 7 is an enlarged sectional view taken substantially along the plane 7—7 of FIGURE 4.

Means are provided for retaining the shifting arms 34 in either the operative or inoperative position. These means are provided, of course, only on the plates 40 on the inner face of the tire 20 and act in conjunction with the second portions 52 and projections 54 of the shifting arms 34. In order to retain the shifting arms 34 in the inoperative position, a stop in the form of a stub projection or such 80 is utilized. Slightly spaced from the stub projection 80 is a ball detent 82 which is spring-urged by a spring 84 disposed in recess 86 extending perpendicular to the plate 40. When the tire 20 is rotated clockwise as shown in FIGURE 4 and the projections 54 of the shifting arms 34 engage the engaging block 70, the shifting arms 34 are projected over the ball detent 82 against the stop 80. The ball detent 82 retains the shifting arms 34 in this inoperative position as illustrated in FIGURE 2 until the solenoid 60 is again energized. Then, the engaging block 70 will carry the shifting arms 34 counterclockwise to the position shown in FIGURE 4 if the tire 20 be moved in reverse or counterclockwise as shown in FIGURE 2. In order to retain the shifting arms 34 in the operative position shown in FIGURE 4, an automatic catch release mechanism 86 is provided. The catch release mechanism 86 is particularly illustrated in FIGURE 7 and includes a first surface 88 which is pivoted to the plate 40 about pin 90. A coil spring 92 is utilized to spring urge the surface 88 clockwise about the pin 90 shown in FIGURE 7. A second surface 94 is provided with the surfaces 88 and 94 defining a vertex therebetween. Secured to the surface 88 at the vertex is a depending guide member 96 terminating in a perpendicular leg 98. The plates 40 define a slot 100 within which the guide 96 and perpendicular leg 98 ride so as to allow the vertex defined by the surfaces 88 and 94 to move reciprocably perpendicular with respect to the plates 40. A recess 102 is provided within which the free end of the surface 94 slidably rides. The surface 94 defines a notch 104 adapted to receive the terminal portion of the second portion 52 of the shifting arm 34. The automatic catch release 86 operates in a manner such that when the engaging block 70 pivots the shifting arm 34 from an inoperative to an operative gripping position, the second portion 52 of the shifting arm 34 will ride over the first surface 88 so as to depress the defined vertex and carry the guide member 96 into the plate 40. As the second portion 52 of the shifting arm 34 passes over the vertex defined between the surfaces 88 and 94, the spring 92 immediately moves the defined vertex away from the plate 40 catching the second portion 52 of the shifting arm 34 in the notch 104 defined in the surface 94. In this manner, the gripping elements 32 are retained in an operative position. When the shifting arms 34 are to be released for returning the gripping elements 32 to an inoperative position, the engaging block 70 moves to the dotted line position shown in FIGURE 5 in response to the energization of the solenoid 60 and initially engages the second surface 94 to depress the vertex carrying the guide member 96 into the plate 40 and sweeping the shifting arms 34 clockwise over the ball detent 82 which then retains the shifting arms 34 in the inoperative gripping position.

From the above, it will therefore be appreciated that novel and improved vehicle ice grip means have been provided which eliminates the necessity of using snow tires or chains and which permits the transformation of a tire from one having positive gripping qualities to one having normal riding qualities by merely closing a switch mountable upon the vehicle dashboard. It will further be appreciated that the various portions of the invention and particularly the gripping elements which are subject to wear may be replaced easily. The tires can be balanced for high speed driving when the grips are in the inoperative or retracted position thereby assuring proper riding qualities the year around.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a vehicle tire defining spaced axial recesses on the circumference thereof, a device for facilitating gripping on ice and snow comprising gripping members disposed in said recesses, each of said gripping members including a hub portion and a gripping element extending therefrom and means for selectively pivoting said hub for disposing said element either wholly in said recess tangential to said tire or extending therefrom along a radius of said tire, said means including a shifting arm defining a portion extending parallel to the plane of said tire and fixed to said hub, plates extending parallel to the plane of said tire disposed adjacent each face thereof, said plates defining ears on opposite ends of said axial recesses, said hub portions journaled between opposed ears, and means carried by said plates for retaining said shifting arm portions in a first position corresponding to the tangential disposition of said gripping elements and a second position corresponding to the radial disposition of said elements, and a solenoid supported adjacent said shifting arm portions, said solenoid including an armature engageable with the shifting arms upon energization of said solenoid carrying the shifting arms to said first or second position dependent upon the selective direction of rotation of said tire.

2. In combination with a vehicle tire defining spaced axial recesses on the circumference thereof, a device for facilitating gripping on ice and snow comprising gripping members disposed in said recesses, each of said gripping members including a hub portion and a gripping element extending therefrom and means for selectively pivoting said hub for disposing said element either wholly in said recess tangential to said tire or extending therefrom along a radius of said tire, said means including a shifting arm defining a portion extending parallel to the plane of said tire and fixed to said hub, plates extending parallel to the plane of said tire disposed adjacent each face thereof, said plates defining ears on opposite ends of said axial recesses, said hub portions journaled between opposed ears, a continuous cable exending parallel to each face of said tire, said plates defining apertures, said cables passing through said plate apertures.

3. In combination with a vehicle tire defining spaced axial recesses on the circumference thereof, a device for facilitating gripping on ice and snow comprising gripping members disposed in said recesses, each of said gripping members including a hub portion and a gripping element extending therefrom and means for selectively pivoting said hub for disposing said element either wholly in said recess tangential to said tire or extending therefrom along a radius of said tire, said means including a shifting arm defining a portion extending parallel to the plane of said tire and fixed to said hub, plates extending parallel to the plane of said tire disposed adjacent each face thereof, said plates defining ears on opposite ends of said axial recesses, said hub portions journaled between opposed ears, and means carried by said plates for retaining said shifting arm portions in a first position corresponding to the tangential disposition of said gripping elements and a second position corresponding to the radial disposition of said elements, said means for retaining said shifting arm portions in said second position including a catch having a pair of angularly related surfaces defining a vertex therebetween, one of said surfaces terminally and pivotally fixed to said plate, a second of said surfaces defining a notch for receiving said shifting arm portion and spring means urging said first surface to urge said vertex away from said plate.

4. The combination of claim 3 wherein said first surface is positioned on said plate between said second surface and said means for retaining said shifting arms in a first position.

5. In combination with a vehicle tire defining spaced axial recesses on the circumference thereof, a device for facilitating gripping on ice and snow comprising gripping members disposed in said recesses, each of said gripping members including a hub portion and a gripping element extending therefrom and means for selectively pivoting said hub for disposing said element either wholly in said recess tangential to said tire or extending therefrom along a radius of said tire, said means including a shifting arm defining a portion extending parallel to the plane of said tire and fixed to said hub, plates extending parallel to the plane of said tire disposed adjacent each face thereof, said plates defining ears on opposite ends of said axial recesses, said hub portions journaled between opposed ears, and means carried by said plates for retaining said shifting arm portions in a first position corresponding to the tangential disposition of said gripping elements and a second position corresponding to the radial disposition of said elements, said means for retaining said shifting arm portions in said first position including a spring urged ball detent reciprocably movable perpendicular to said plates.

References Cited in the file of this patent

UNITED STATES PATENTS

| | | |
|---|---|---|
| 1,052,317 | Clement | Feb. 4, 1913 |
| 1,099,219 | Walters et al. | June 9, 1914 |
| 2,561,910 | Coffey | July 24, 1951 |
| 2,672,908 | Donegan | Mar. 23, 1954 |
| 2,894,554 | Laughlin | July 14, 1959 |